Dec. 2, 1958  S. T. WILLIAMS  2,862,539
TUBELESS TIRE VALVE
Filed Dec. 17, 1954

INVENTOR.
Selden T. Williams
BY
Churchill, Rich, Weymouth & Engel
ATTORNEYS.

2,862,539

TUBELESS TIRE VALVE

Selden T. Williams, Bellerose, N. Y., assignor to Scovill Manufacturing Company, Waterbury, Conn., a specially chartered corporation of Connecticut Application December 17, 1954, Serial No. 475,959

4 Claims. (Cl. 152—427)

The present invention relates to valve stems for tubeless pneumatic tires and aims to provide certain improvements in such valve stems. More particularly it relates to a valve stem having an elastomeric housing, at least part of which may be stretched so that when said part is stretched and inserted through a valve stem hole in a wheel rim and the tension on the stretched portion is withdrawn, it will snap into position to lock the valve stem onto the rim with a fluid-tight seal.

Among the objects of the present invention are to provide a valve stem of the character set forth (1) which can be easily mounted onto a rim and lock securely thereto; (2) which will, when mounted on the rim, provide a fluid-tight seal therewith under all operating conditions; (3) which will avoid shearing of the elastomeric housing at the rim hole upon sidewise displacement of the valve; and (4) which has means for indicating, in the act of mounting the valve stem on the rim, that the valve stem is in proper relation to the rim to be anchored therein.

The foregoing and other objects of the invention not specifically enumerated are accomplished by forming the valve stem with an elastomeric housing having a gradual taper for easy insertion through the rim hole, adjacent axial portions of the housing having different external diameters, one of which portions, where it is to engage within the rim hole, has a normal diameter larger than that of the rim hole; an adjacent or second portion of which has an enlarged diameter formed with an axially-extending, peripheral lip or flange for contact with a face of the rim and with a recessed base to provide better rim accommodation of the peripheral lip; and with a shortened insert to avoid shearing of the housing at the rim hole; said insert having a rounded and relieved inner end to provide a free hingeable action of the valve stem relative to the rim and also provide a desirable length of stretchable elastomeric material in the region of the hole in the rim upon which the valve stem is to be mounted. The invention in its various aspects will be more fully appreciated and understood from the detailed description which follows, when considered in connection with the accompanying drawings, wherein:

Figure 1:
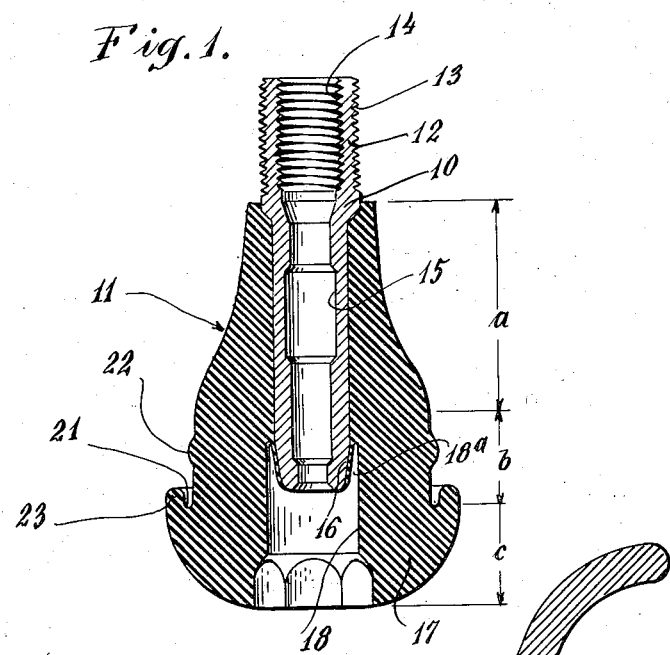
Figure 1 shows in axial section a tubeless tire valve stem, embodying the invention.
Figure 2:
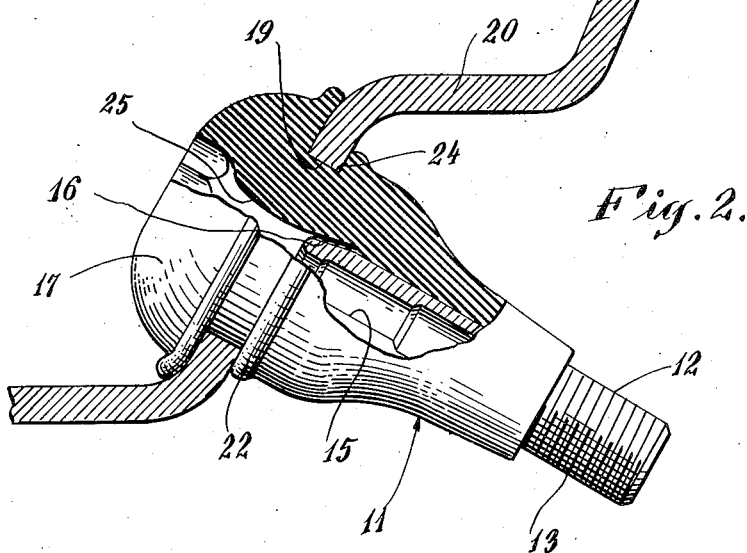
Fig. 2 shows the valve stem of Fig. 1, partly broken away, mounted on a wheel rim.

Referring to the drawings, the valve stem comprises a tubular insert 10 to which is adhesively bonded an elastomeric housing 11.

The tubular insert 10 is preferably formed of metal and, as is conventional, has a nipple portion 12 externally threaded at 13 and internally threaded at 14 and formed inwardly of said internal threads with a chamber 15 adapted to accommodate a standard, replaceable valve insides or core (not shown). At its innermost end the tubular insert is externally relieved and rounded, as shown at 16, for a purpose which will presently appear.

The elastomeric housing 11 is preferably formed of rubber and externally is generally tapered and of increasing diameter from the nipple end of the stem to an enlarged clamping base 17 whereat it is formed with an enlarged axial recess or socket 18 which extends inwardly beyond the base 17 into encompassing relation to the end 16 of the insert and establishes open communication with the interior of the insert. The external wall of the housing may be considered as having adjacent axial portions indicated as a, b and c, of different external diameters, the outer end portion a being generally tapered outwardly from the nipple end of the stem and for the major portion of its length is of smaller diameter than a hole 19 in a wheel rim 20 upon which the valve is to be mounted; the portion b being of substantially cylindrical form having a uniform diameter larger than the diameter of the hole 19 and merging at its outer end with the portion a and the portion c being of considerably larger diameter than the hole in the rim and forming with the portion b a shoulder 21. The portion b is preferably formed intermediate its ends with a peripheral bead 22 convex in axial section, the function for which bead will presently appear. At the shoulder portion 21 the base 17 is formed with an axially extending lip or flange 23 in circumferentially spaced relation to the external wall of the portion b. Preferably the inner end of the insert 10 extends into the socket 18 to approximately the plane of the top of the lip 23 so that when the valve stem is mounted within the hole in the rim, the lip will be flattened into engagement with the rim face and said inner end of the insert will be in proximity to the plane of the opposite face of the rim. The housing 11 is bonded to the insert throughout the contiguous surfaces of said parts and the portion b has the axial part of the surface of its inner wall, which encompasses the inner end of the insert radically spaced therefrom to provide an annular space 18a to provide a hinged, flexible connection between the base end of the housing and the insert. The annular space 18a also increases the length of the rubber housing embraced by the portions b and c which is unbounded to the insert, rendering the same stretchable and thereby facilitates the insertion of the valve stem into the rim hole. The valve stem base end of the enlarged axial recess 18 is herein shown as being somewhat further enlarged and of polygonal form in horizontal cross-section, the polygonal form resulting from the use of wrench-engaging surfaces on a removable mold pin for providing said recess.

From a consideration of the valve stem construction hereinbefore described and the forms and relationship of the parts thereof, it will be understood that the valve stem may be readily mounted onto a wheel rim for a tubeless tire prior to mounting the tire on the rim, by inserting the nipple end of the stem through the rim hole 19 from the tire side of the rim whereupon the major length of the axial portion a of the housing will pass through said rim hole. At this stage of the procedure, force is applied to the inner end of the insert by a tool inserted into the axial recess 18, or tension is applied to the outer end of the insert, whereupon the axial portion b will be stretched or tensioned to reduce its outer diameter so that it will pass through the hole in the rim. The elastomeric housing may be lubricated with a soap solution or the like to facilitate passage through the rim hole. In the course of mounting the valve stem, the peripheral bead 22, upon passing through the rim hole, will serve as a tell-tale to indicate that the valve stem shoulder 21 has been pressed home against the tire face of the rim, whereupon the force or tension being applied to the insert will be withdrawn. Upon withdrawing such force or tension, the stretched or tensioned portion of the elastomeric housing, in seeking to return to its normal condition, will cause the portion b including bead 22 to increase in diameter to overlie the face of the rim, as shown at 24, to provide a fluid-tight seal therewith. Concurrently therewith, the part of the axial portion b which is confined within the rim hole, will likewise increase in diameter and be subjected to compression and deformed as shown at 25, into contact with the relieved end 16 of the insert to assist and maintain a fluid-tight seal with the wall of the rim hole, and the axially-extending lip or flange 23 will promote a conforming fluid-tight rim contact with the tire side of the rim irrespective of irregularities in said face. Due to the stretching of the housing, the insert 10 becomes displaced axially outwardly of the rim and the deformed housing becomes wedged within the annular space 18a between the inner elastomeric sheathed end of the insert and the encompassing portion of the housing and serves to prevent shearing of the housing at the rim hole. The filling of the annular space 18a does not impair the hinged, flexible connection between the base end of the housing and the insert end of the valve stem. The relationship of the hinged connection between the casing and the inner end of the insert, the axially extending lip or flange 23 and the enlarged recess 18 will all cooperate to insure the formation of a fluid-tight seal between the base of the housing and the rim even under shearing stresses tending to cant the valve stem.

From the foregoing detailed description it will be apparent that I have provided a tubeless tire valve stem which will accomplish all of the objects set forth in the opening statement of the specification and, although the foregoing disclosure represents a preferred embodiment of my invention, it is to be understood that changes in details of construction may be resorted to within the range of mechanical and engineering skill, without departing from the spirit of the invention as hereinafter claimed.

What I claim is:

1. A snap-in valve stem for mounting in a valve stem hole in a wheel rim for a tubeless tire, said valve stem comprising a non-deformable tubular insert adapted to accommodate a valve insides or core and an elastomeric tubular housing coaxially encompassing and bonded to the insert; said housing having an enlarged base, a portion of substantially cylindrical form adjacent the base and forming therewith a shoulder, said base having an axial socket of larger diameter than the inner end of the insert and extending upwardly into the cylindrical portion and encompassing the inner end portion of the tubular insert, said cylindrical portion being of larger outer diameter than the valve stem hole in the rim and having intermediate its ends a peripheral bead, said housing also having an outer end portion which is generally tapered outwardly from its outer end with the major part of its length being of a diameter to pass freely through said valve stem hole and its inner end being of a diameter merging with the cylindrical portion, said insert having its inner end portion uninterruptedly radially spaced and unbonded to said encompassing housing portion in the region where said cylindrical portion extends through the rim hole when the valve stem is mounted on the rim; and said housing being capable of being axially tensioned or stretched in relation to the bonded portion to reduce the external diameter of the unbonded portion, whereby when the valve stem is inserted into the rim hole from the tire side of the rim and the large end of the tapered portion of the housing engages the wall of said hole and a tensioning force is applied to said unbonded portion in a direction to cause said cylindrical portion to enter the hole, said cylindrical portion and the peripheral bead thereon will have their diameters reduced and enter the hole, the emergence of the peripheral bead through the rim hole will serve as a tell-tale to indicate that the valve stem shoulder has been pressed home against the tire face of the rim and that the tensioning force may be withdrawn, so that upon withdrawing the tensioning force, the said cylindrical portion of the housing and the peripheral bead thereon will, due to the contractile force tending to return said cylindrical portion and bead to their normal diameters, lock the valve stem onto the rim within and around the hole therein to provide a fluid-tight seal therewith.

2. A snap-in valve stem according to claim 1 wherein the insert has a length such that its inner end portion terminates outwardly of the plane of the shoulder formed by the base with the cylindrical portion.

3. A snap-in valve stem according to claim 1 wherein the enlarged base is formed with an annular lip or flange extending axially toward the outer end portion of the valve stem in radially spaced relation to the cylindrical portion.

4. A snap-in valve stem according to claim 1 wherein the peripheral bead is convex in axial section.

References Cited in the file of this patent

UNITED STATES PATENTS

| | | |
|---|---|---|
| 1,915,249 | Jorgensen | June 20, 1933 |
| 1,978,249 | Decarie | Oct. 23, 1934 |
| 2,049,252 | Eberhard | July 28, 1936 |
| 2,634,785 | Tubbs | Apr. 14, 1953 |
| 2,769,476 | Herzegh | Nov. 6, 1956 |
| 2,818,101 | Boyer | Dec. 31, 1957 |

FOREIGN PATENTS

| | | |
|---|---|---|
| 16,532 | Great Britain | 1896 |